US007555655B2

(12) United States Patent
Smith et al.

(10) Patent No.: US 7,555,655 B2
(45) Date of Patent: Jun. 30, 2009

(54) APPARATUS, SYSTEM, AND METHOD FOR GENERATING AND AUTHENTICATING A COMPUTER PASSWORD

(75) Inventors: Steven W. Smith, Dallas, TX (US); James B. Pritchard, Fairview, TX (US); Sidney L Westharford, Richardson, TX (US)

(73) Assignee: 5th Fleet, L.L.C., Richardson, TX (US)

( * ) Notice: Subject to any disclaimer, the term of this patent is extended or adjusted under 35 U.S.C. 154(b) by 826 days.

(21) Appl. No.: 11/149,818

(22) Filed: Jun. 10, 2005

(65) Prior Publication Data

US 2006/0136740 A1   Jun. 22, 2006

Related U.S. Application Data

(63) Continuation-in-part of application No. 11/020,780, filed on Dec. 22, 2004, now Pat. No. 7,430,756.

(51) Int. Cl.
    *H04L 9/00* (2006.01)
(52) U.S. Cl. .................. 713/185; 713/184; 713/182
(58) Field of Classification Search ................. 713/185, 713/184, 182
    See application file for complete search history.

(56) References Cited

U.S. PATENT DOCUMENTS

| 4,197,524 | A | 4/1980 | Salem |
| 4,455,588 | A | 6/1984 | Mochida et al. |
| 4,621,334 | A | 11/1986 | Garcia |
| 4,805,222 | A | 2/1989 | Young et al. |
| 5,241,594 | A | 8/1993 | Kung |

2002/0147930 A1   10/2002   Pritchard et al.

OTHER PUBLICATIONS

The Failure of Two-Factor Authentication, Schneier; from www.schneier.com, dated Mar. 15, 2005.*
Key Management and Distribution for Authenticating Group Communication Shantharajah, S.P.; Duraiswamy, K.; Nawaz, G.M. Kadhar; Industrial and Information Systems, First International Conference on Aug. 8-11, 2006 pp. 133-137.*
User assigned security policy framework for m-commerce applications Aramudhan, M.; Computer and Communication Engineering, 2008. ICCCE 2008. International Conference on May 13-15, 2008 pp. 148-150.*

(Continued)

*Primary Examiner*—David Y Jung
(74) *Attorney, Agent, or Firm*—Steven W. Smith

(57) ABSTRACT

An apparatus, system, and method for constructing, transmitting, and authenticating a password utilized by an authentication device to authenticate an access device. The authentication device receives the password from the access device, authenticates the access device if the password matches stored information, and returns an acknowledgment message that includes an index value associated with a stored character set. The access device constructs and transmits the password. The access device receives from a user, a plurality of predefined characters forming a User ID. The access device also receives the acknowledgment message and index value from the authentication device. The index value is used to identify a character set from a plurality of character sets stored in a lookup table. The access device integrates the User ID and the identified character set to generate a password, and transmits the password to the authentication device.

23 Claims, 6 Drawing Sheets

OTHER PUBLICATIONS

Mobile Device Security Using Transient Authentication Nicholson, A.J.; Corner, M.D.; Noble, B.D.; Mobile Computing, IEEE Transactions on vol. 5, Issue 11, Nov. 2006 pp. 1489-1502*

RSA Security, Authenticators, *The Gold Standard in Two-Factor User Authentication*, www.rsasecurity.com, Feb. 15, 2005.

* cited by examiner

APPARATUS, SYSTEM, AND METHOD FOR GENERATING AND AUTHENTICATING A COMPUTER PASSWORD

RELATED APPLICATIONS

This application is a continuation-in-part of U.S. patent application Ser. No. 11/020,780 filed Dec. 22, 2004 now U.S. Pat. No. 7,430,756 in the name of Steven W. Smith, the disclosure of which is incorporated herein by reference in its entirety.

BACKGROUND OF THE INVENTION

1. Technical Field of the Invention

The present invention is directed, in general, to computer security systems. More particularly, and not by way of limitation, the present invention is directed to an apparatus, system, and method for generating and authenticating a password to protect a computer system from unauthorized access.

2. Description of Related Art

Computers and networks are often protected by passwords. In order to gain access to the computer or network, a user must enter a password. The computer or network controller (server) authenticates the password by comparing the password entered by the user with a stored password. If the entered password matches the stored password, the user is given access. If not, the user is denied access.

A major problem with password-protected computer systems is the already large and growing threat from "snoops." The popular definition of a snoop refers to individuals who intercept messages sent from one computer system to another for the purpose of stealing data or learning passwords that can then be used to gain unauthorized access to networks or confidential information.

A snoop may gain access to an Internet router or access point where the snoop can read data as it is routed from one location to another. Encryption of the data may prevent the snoop from making use of the intercepted data. However, for various reasons, much of the data sent over the Internet is not encrypted. For example, most household computer users do not encrypt data such as passwords when they access online services. Such users may access bank accounts, online brokerage accounts, credit card accounts, and other such accounts containing highly sensitive data. If a snoop intercepts an unencrypted access message intended for a target account, and the message includes the user's password and user ID, the snoop can then access the target account and perform any actions that the user himself may be authorized to perform.

In one existing solution, the user creates a two-factor password whenever the user logs on. The first factor is the user's personal identification number (PIN), which the user enters as the first part of the password. The user obtains the second factor from an electronic token, which displays a 6-digit number. The token is time-synchronized with the authentication server, and the number displayed on the token changes every minute. The user enters the 6-digit number displayed on the token as the second part of the password. Any hacker who has learned the user's PIN cannot gain access because the hacker does not know the second factor, i.e., the 6-digit number from the token.

This two-factor password works well, but has several disadvantages. First, if a user does not have his token with him, he cannot log in. Second, if the token breaks or the battery fails, the user cannot log in. Third, even if everything works as advertised, the user has the burden of having to look at the token and enter a different 6-digit number, in addition to the user's PIN, every time he logs on. If a company has a network that kicks the user off every 5-10 minutes if he doesn't continually use the computer, entering the extra token number every time he logs back on becomes a serious burden.

Therefore, a need exists in the art for an improved system and method for generating and authenticating a password to protect a computer system from unauthorized access. In particular, there is a need for an apparatus, system, and method that is simple to implement, capable of providing an online computer system with protection against snoops, and does not place any additional burden on the user. The present invention provides such an apparatus, system, and method.

SUMMARY OF THE INVENTION

In one aspect, the present invention is directed to an apparatus in an access device for constructing and transmitting a password utilized by an authentication device to authenticate the access device. The apparatus includes means for receiving from a user, a plurality of predefined characters forming a User ID; a lookup table for storing a plurality of character sets, each character set including a plurality of predefined characters, wherein each character set is associated with a predefined index value; and communication means for receiving an index value from the authentication device. The apparatus also includes means for generating a password utilizing a character set associated with the index value received from the authentication device; and means for transmitting the password to the authentication device.

In another aspect, the present invention is directed to a method of constructing and transmitting a password utilized by an authentication device to authenticate the access device. The method includes receiving from a user, a plurality of predefined characters forming a User ID; receiving an index value from the authentication device; and identifying a character set associated with the index value in a lookup table in which a plurality of character sets are stored. Each character set includes a plurality of predefined characters, and each character set is associated with a predefined index value. The method also includes generating a password utilizing the identified character set associated with the index value received from the authentication device; and transmitting the password to the authentication device.

In another aspect, the present invention is directed to a system for constructing, transmitting, and authenticating a password utilized by an authentication device to authenticate an access device. The system includes an authentication device for authenticating the password. The authentication device includes communication means for receiving the password from the access device and returning an acknowledgment message to the access device; means for positively authenticating the access device if the password matches stored information associated with the access device; and means for selecting an index value and including the selected index value in the acknowledgment message returned to the access device, said index value being associated with a stored character set. The system also includes an access device for constructing and transmitting the password. The access device includes means for receiving from a user, a plurality of predefined characters forming a User ID; and a lookup table for storing a plurality of character sets. Each character set includes a plurality of predefined characters, and each character set is associated with a predefined index value. The access device also includes communication means for receiving the acknowledgment message including the index value from the authentication device; means for generating a password utilizing a character set associated with the index value received from the authentication device; and means for transmitting the password to the authentication device.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention is an improved system and method for generating and authenticating a password to protect the password from snoops and to prevent unauthorized access to secure information. In the description herein, the invention is described in terms of a user accessing an authentication server over a public data network such as the Internet. It should be understood that the description herein is exemplary only, and the invention is applicable to all types of password-protected computer systems.

Figure 1:
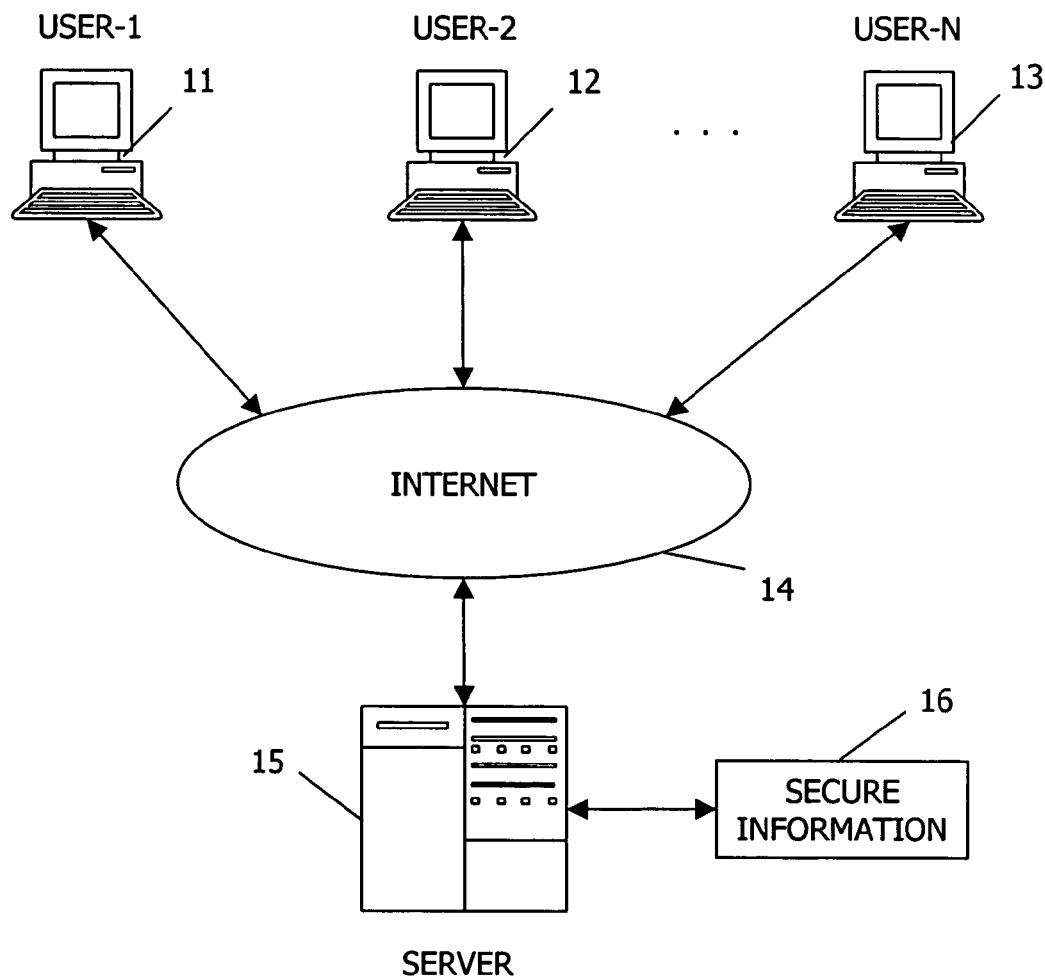
FIG. 1 is a simplified functional block diagram of an Internet connection suitable for implementing the present invention.

FIG. 1 is a simplified functional block diagram of an Internet connection suitable for implementing the present invention. A plurality of user terminals such as User-1 11, User-2 12, and User-N 13 communicate through a data network such as the Internet 14 with an authentication server 15. The user terminals may be PCs, workstations, or any other type of computer access device capable of forming and sending a password. The data network may also be, for example, an Internet Protocol (IP)-based local area network (LAN), wide area network (WAN), wireless LAN (WLAN), or any other suitable means for connecting each of the user terminals to the server. The authentication server may provide access to secure information after properly verifying an accessing user's password.

Figure 2:
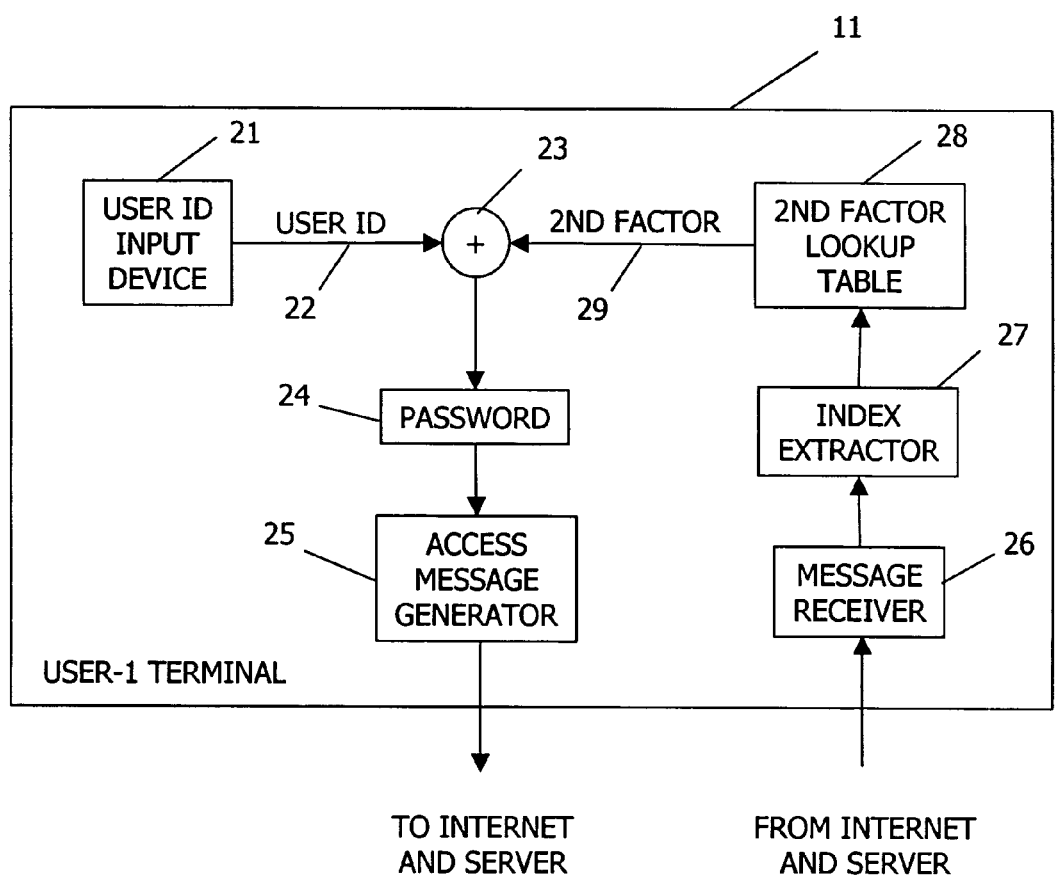
FIG. 2 is a simplified functional block diagram of a user terminal modified in accordance with the present invention.

FIG. 2 is a simplified functional block diagram of a user terminal such as User-1 terminal 11 modified in accordance with the present invention. The terminal includes a User ID input device such as a keyboard or keypad for inputting a User ID 22 unique to the user. The User ID is passed to a password generator 23. The first time the user attempts to access the server 15, the password generator may use the User ID by itself as the password 24. Alternatively, if the user is opening a new account, the account operator may provide the user with additional identifying information to enter the first time along with the User ID. In this case, the password generator 23 integrates the User ID 22 and the additional information to form the password 24. An access message generator 25 then incorporates the password into an access message that is sent over the Internet 14 to the server.

After the server 15 authenticates the password, the server returns an acknowledgment (ACK) message to a message receiver 26 in the User-1 terminal 11. The ACK message includes an index value. An index extractor 27 extracts the index value and uses it to access a second-factor lookup table 28 and identify a second factor 29. In a subsequent access attempt by User-1, the password generator 23 integrates the User ID 22 and the second factor 29 to form the integrated password 24. After each successful access, the server sends a new index value to the User-1 terminal. Consequently, a different second factor is integrated with the User ID each time User-1 accesses the server. Thus, even though the user always enters the same User ID, a different and unique password is transmitted to the server for each access.

In an alternative embodiment, the User-1 terminal 11 includes an authentication unit, which verifies that the user enters a valid User ID or combination of User ID and password. Once the entered data has been positively verified, the password generator 23 generates a new password by replacing some or all of the entered data with a second factor drawn from the lookup table 28. As in the previous embodiment, after each successful access, the server sends a new index value to the User-1 terminal. Consequently, a different second factor is drawn from the lookup table and utilized as the password each time the user accesses the server. Thus, a different password, totally unrelated to the user's entered information, is transmitted over the network for each access.

In one embodiment, each user terminal has a different second-factor lookup table 28. In addition, the server may periodically push a new lookup table to each user terminal, thus replacing each terminal's lookup table with a new lookup table. Lookup tables may be replaced as often as the network operator desires. In other embodiments, the lookup table may be externally located from the user terminal. The password generator 23 may be adapted to access the external lookup table whenever a User ID 22 is received from the user.

In various embodiments of the present invention, the second factor 29 may be anything that changes the nature of the User ID 22 entered by the user. For example, the second factor may be (1) additional alphanumeric characters that are added to the User ID or that replace characters of the User ID, (2) blank packets placed between the characters of the User ID, (3) time intervals between the transmission of the characters of the User ID, and the like. Examples of these embodiments are further described below.

FIGS. 3A-3F are illustrative drawings of exemplary methods of integrating a User ID and a second factor comprising additional alphanumeric characters to form an integrated password data structure. In each figure, an exemplary User ID of ABCD and an exemplary second factor of 1234 are shown for illustrative purposes only. In practice, the User ID, second factor, or both may include a greater number of characters, and each may include a mixture of letters, numbers, other characters, and time intervals.

Figure 3A:
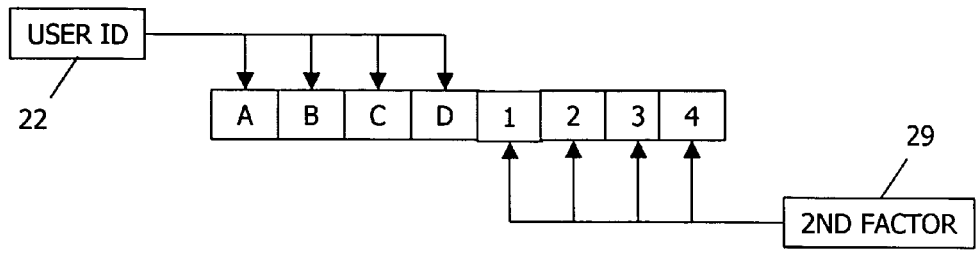
FIGS. 3A-3F are illustrative drawings of exemplary methods of integrating a User ID and second factor to form an integrated password data structure.

Referring first to FIG. 3A, an example is shown in which the password generator 23 integrates the User ID 22 and the second factor 29 by adding the second factor onto the end of the User ID.

Figure 3B:
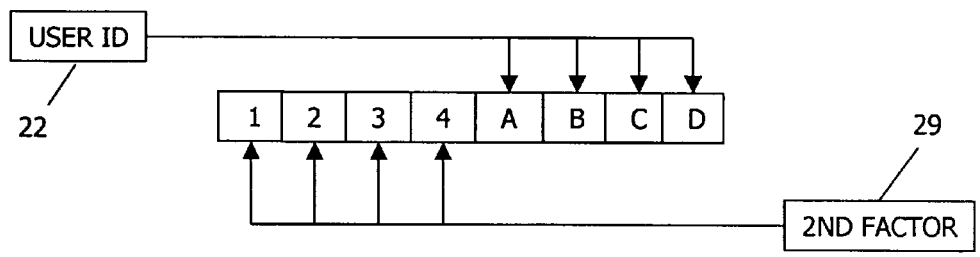

Referring next to FIG. 3B, an example is shown in which the password generator 23 integrates the User ID 22 and the second factor 29 by adding the second factor to the front of the User ID.

Figure 3C:
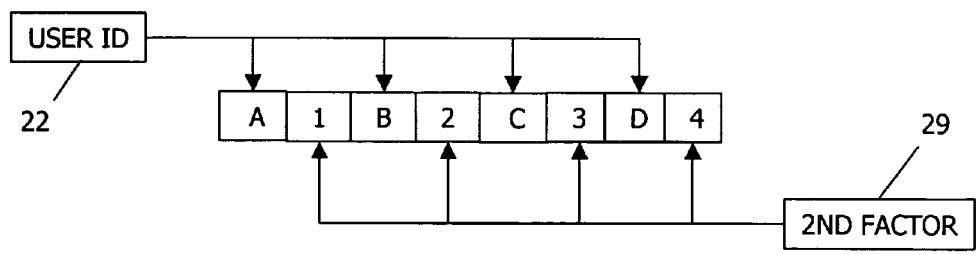

Referring next to FIG. 3C, an example is shown in which the password generator 23 integrates the User ID 22 and the second factor 29 by interleaving one or more characters of the second factor between the characters of the User ID. Any number of characters of the second factor may be placed between any two characters of the User ID, while no second-factor characters are placed between other characters of the User ID. This creates a large number of potential combinations for forming the integrated password. As long as the server 15 knows the integration scheme, the server can still properly verify the integrated password.

Figure 3D:
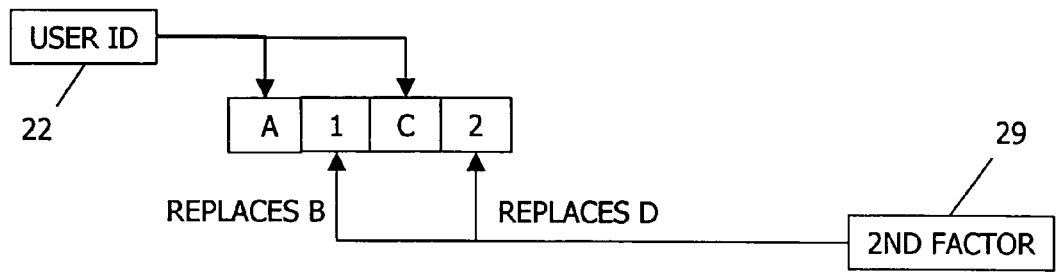

Referring next to FIG. 3D, an example is shown in which the password generator 23 replaces one or more or all of the characters of the User ID 22 with the second factor 29. Specifically, the example is shown in which the password generator replaces the character "B" in the User ID with the numeral "1", and replaces the character "D" in the User ID with the numeral "2". Preferably, this is done after the user terminal verifies that the entered User ID (ABCD) is a valid User ID. Alternatively, the characters of the User ID may be transmitted in separate packets, and information from the second factor may be added to some or all of the User ID character packets.

Figure 3E:
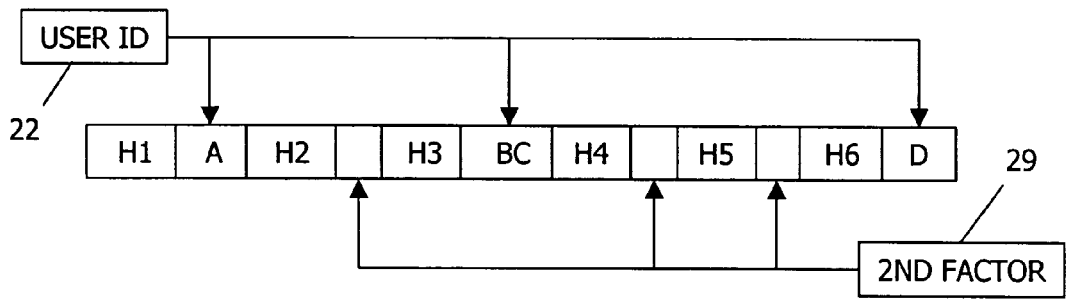

Referring next to FIG. 3E, an example is shown in which the password generator 23 places one or more of the characters of the User ID in different data packets, and the second factor comprises a number of blank packets that are inserted between the character data packets. Each packet comprises a header (H) and a payload. In the example shown, one blank packet is inserted after the data packet carrying the character "A", and two blank packets are inserted after the data packet carrying the characters "B" and "C". The number of blank packets to be inserted between each pair of data packets may be determined from a number sequence drawn from the second-factor lookup table 28. A blank packet may consist of a packet header, with either no data payload, or filler data that is recognized by the server as not being a password character. All packet headers normally include a source address, destination address, and a packet sequence number. When the server receives the password, the server analyzes the sequence numbers to determine how many blank packets were transmitted between each of the characters of the password. The server positively verifies the password only if both the received characters are correct, and the correct number of blank packets was transmitted.

Figure 3F:
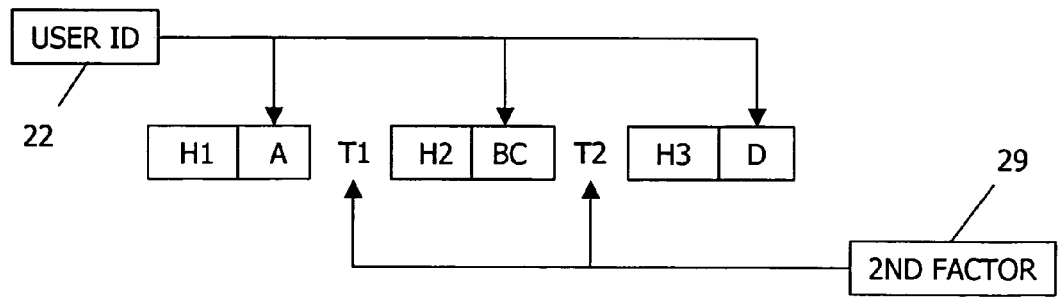

Referring next to FIG. 3F, an example is shown in which the password generator 23 places one or more of the characters of the User ID in different data packets, and the second factor comprises time intervals between the times of transmission of the data packets carrying the characters of the User ID. In the example shown, a first time interval (T1) separates the data packet carrying the character "A" from the data packet carrying the characters "B" and "C". A second time interval (T2) separates the data packet carrying the characters "B" and "C" from the data packet carrying the character "D". The time intervals may be stored as a number sequence drawn from the second-factor lookup table 28. The character packets are transmitted to the server one at a time, and the access message generator 25 delays the transmission of each data packet by the time interval specified by the location in the second-factor sequence of numbers. The time interval may be of any length, from zero delay to several seconds, hours, or even days, depending on how long the user is willing to wait for the complete password to be transmitted. The server in this embodiment includes a timing unit, which measures the time intervals between the receptions of each of the data packets. Testing has shown that the timing between data packets is consistent, within small tolerances of several milliseconds, across different types of IP networks and network interfaces. The server positively verifies the password only if both the received characters are correct, and the time intervals between the packets are correct.

Figure 4:
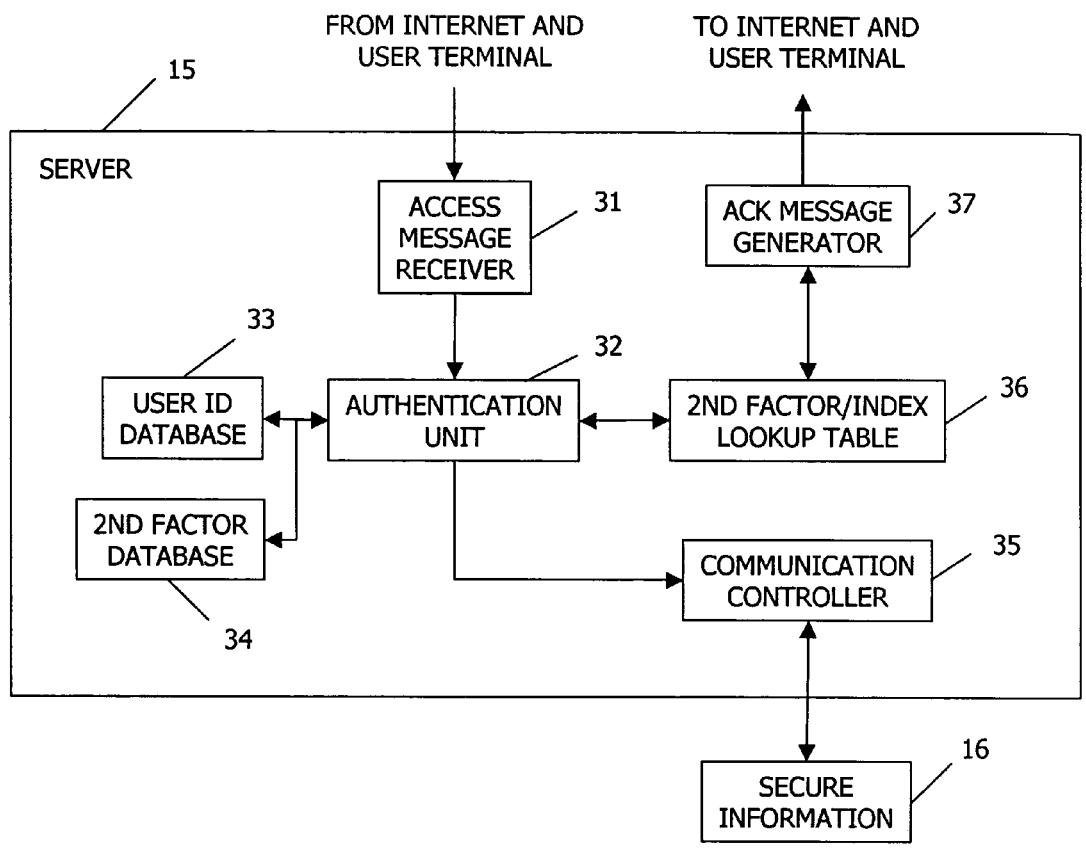
FIG. 4 is a simplified functional block diagram of an exemplary authentication server modified in accordance with the present invention.

FIG. 4 is a simplified functional block diagram of an exemplary authentication server 15 modified in accordance with the present invention. An access message receiver 31 receives an access request from the Internet 14 and the User-1 terminal 11. The password included in the access request is sent to an authentication unit 32. The authentication unit verifies the password by first accessing a User ID database 33 and comparing the User ID portion of the password to a User ID stored in the User ID database. The authentication unit also accesses a second factor database 34 and compares the second factor portion of the password to a second factor stored in the second factor database. This verification may include not only a verification of the characters, but also the placement of the characters in relation to the characters of the User ID in the password. The authentication unit positively verifies the password only if both the User ID and the second factor match. If both match, the authentication unit authorizes a communication controller 35 to provide the user with access to the secure information 16.

Following either a positive or negative verification, the server 15 returns an acknowledgment (ACK) or a negative acknowledgment (NACK) to the User-1 terminal 11. In both the ACK and the NACK, the server includes a new index value for the second factor lookup table 28 in the User-1 terminal. If for some reason the User-1 terminal used the wrong second factor, the inclusion of a new index value in the NACK should resynchronize the User-1 terminal and the server.

In one embodiment, the server 15 retrieves the new index value from a second factor/index lookup table 36. Once an index value and second factor are selected, the second factor is sent to the second factor database 34, and the index value is sent to an ACK (or NACK) message generator 37. The ACK/NACK message is then sent to the User-1 terminal together with the new index value.

In an alternative embodiment, the access message received from the User-1 terminal 11 includes the index value in addition to the password. The authentication unit 32 compares the User ID portion of the password to a User ID stored in the User ID database 33. The authentication unit 32 then accesses the second factor/index lookup table 36 using the index value received in the access message. The authentication unit then compares the received second factor with the second factor associated with the index value in the second factor/index lookup table 36. Thus in this embodiment, the separate second factor database 34 is not required.

Figure 5:
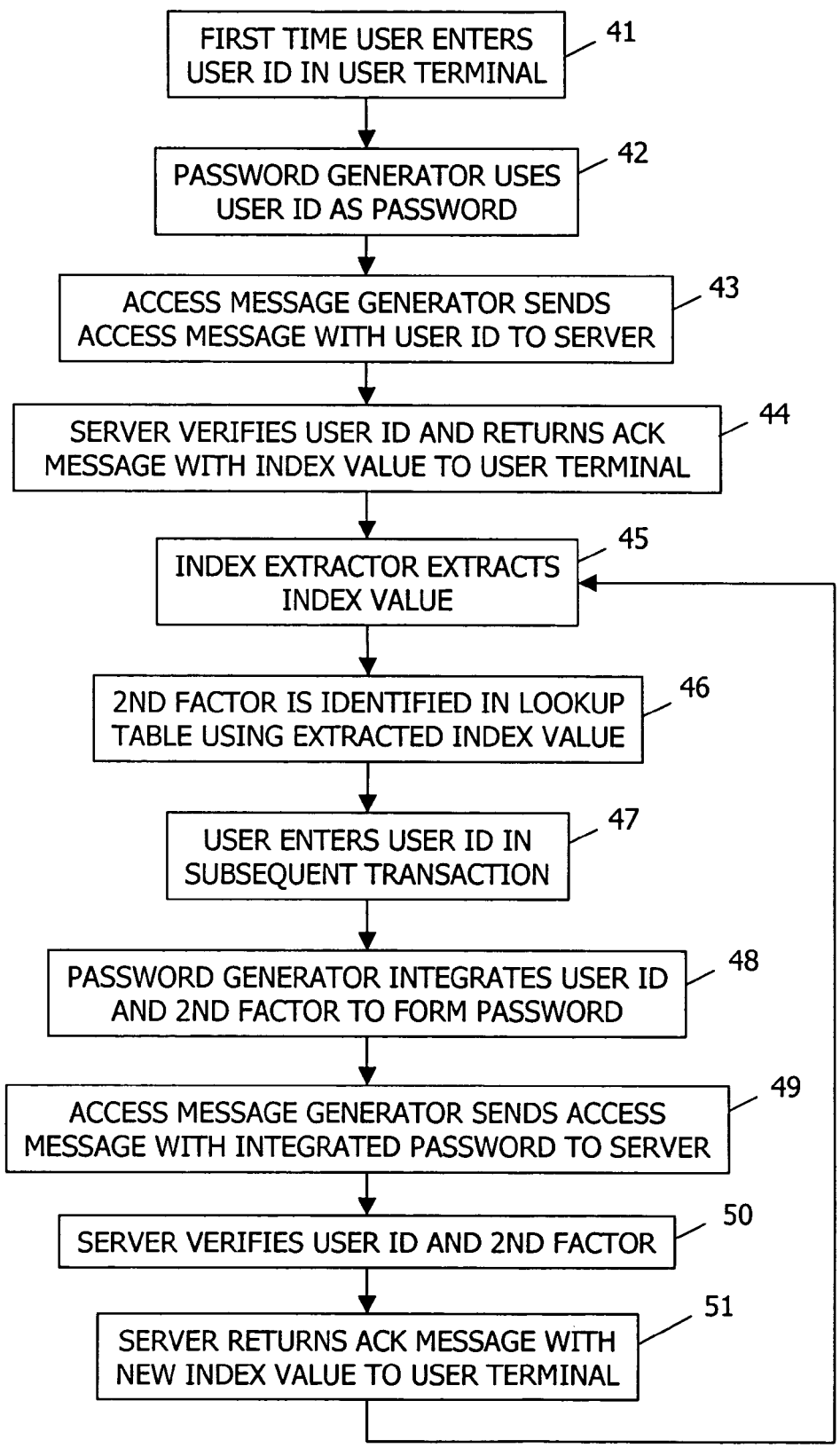
FIG. 5 is a flow chart illustrating the steps of an exemplary embodiment of a method of generating and authenticating a password according to the teachings of the present invention.

FIG. 5 is a flow chart illustrating the steps of an exemplary embodiment of a method of generating and authenticating a password according to the teachings of the present invention. At step 41, at step 41, a first-time user enters a User ID in a user terminal such as User-1 terminal 11. At step 42, the password generator 23 uses the User ID as the password for this first access attempt. At step 43, the access message generator 25 sends an access message with the User ID to the server 15. At step 44, the server verifies the User ID, provides the first-time user with access, and returns an ACK message with an index value to the User-1 terminal.

At step 45, the index extractor 27 in the User-1 terminal 11 extracts the index value from the received ACK message. At step 46, the User-1 terminal identifies a second factor associated with the index value in the lookup table 28. The identified second factor is to be utilized by the User-1 terminal in the next access attempt. Therefore, when the user enters the User ID in a subsequent transaction at step 47, the password generator 23 integrates the User ID and the second factor at step 48 to form a new password. At step 49, the access message generator 25 sends an access message with the integrated password to the server 15. At step 50, the server verifies the User ID and the second factor, and provides the user with access. At step 51, the server and returns an ACK message with a new index value to the User-1 terminal. The process then returns to step 45 and repeats the process by identifying a new second factor to be utilized by the User-1 terminal in the next access attempt. Thus, although the user continues to enter the exact same User ID for each access attempt, a different password is generated and transmitted to the server for each access attempt.

A benefit of the present invention is that it is transparent to the user. That is, the user always enters the same password or User ID for every transaction. The terminal adds a new second factor for each transaction, thus creating a new password for each transaction. The user does not have to remember multiple passwords, does not have to change his password on a periodic basis, or does not have to enter additional numbers from an electronic token. Even if a snoop learns the user's password, the snoop cannot use the password in a subsequent transaction to gain access because the second factor will no longer be valid.

In a preferred embodiment of the present invention, the second factor is identified and integrated with the User ID in a client program resident on the user terminal. This program, along with the second factor lookup table 28 may be downloaded from the server, loaded from a transportable medium, or may be resident on a memory device interfaced with the user terminal. For example, the client program may be resident on a USB flash memory that is simply plugged into the USB port on the user terminal. In this manner, the user can move to a different terminal or access the server from a laptop computer while traveling simply by moving the USB flash memory to a different computer.

When accessing the server over the Internet through an Internet browser, the user may first access a web page where the user is requested to enter a User ID and a password or pin. In one embodiment, when the user enters his normal password, the browser sends the password to the client program, which integrates the password with the second factor. The client program returns the integrated password to the browser, which then transmits the integrated password over the Internet to the server. A browser plug-in such as an ActiveX plug-in may intercept the outgoing user password and modify the password with the second factor drawn from the lookup table. In another embodiment, a Java applet or other type of Browser Helper Object (BHO) may recognize from the keystrokes on the keyboard that the user is typing a password. The user password is then intercepted by the BHO before it goes to the browser. The second factor is added to the password, and the two-factor password is then sent to the browser, which transmits the two-factor password to the server.

It is thus believed that the operation and construction of the present invention will be apparent from the foregoing description. While the system and apparatus shown and described has been characterized as being preferred, it will be readily apparent that various changes and modifications could be made therein without departing from the scope of the invention as defined in the following claims.

What is claimed is:

1. In an access device, a computer-controlled apparatus for constructing and transmitting a password utilized by an authentication device to authenticate the access device, said apparatus comprising:
at least one processor for controlling the following components:
means for receiving from a user, a plurality of predefined characters forming a User ID;
means for transmitting an access message containing the User ID to the authentication device;
a memory for storing a plurality of character sets, each character set including a plurality of predefined characters, wherein each character set is associated with a predefined index;
communication means for receiving an index value from the authentication device;
means for generating a password utilizing a character set associated with the index value received from the authentication device; and
means for transmitting the password to the authentication device.

2. The apparatus of claim 1, wherein the means for generating a password replaces the User ID with the character set associated with the index value received from the authentication device.

3. The apparatus of claim 1, wherein the means for generating a password includes means for integrating the User ID and the character set associated with the index value to form the password.

4. The apparatus of claim 3, wherein the means for integrating the User ID and the character set adds the character set associated with the index value to the end of the user ID.

5. The apparatus of claim 3, wherein the means for integrating the User ID and the character set adds the character set associated with the index value to the beginning of the User ID.

6. The apparatus of claim 3, wherein the means for integrating the User ID and the character set interleaves characters from the character set associated with the index value between the characters of the User ID.

7. The apparatus of claim 3, wherein the means for integrating the User ID and the character set modifies the characters of the User ID with characters from the character set associated with the index value.

8. The apparatus of claim 1, wherein the character sets stored in the memory define time intervals utilized by the transmitting means to separate the transmission times of the characters of the User ID, wherein the transmitting means includes means for placing the characters of the User ID in different data packets, and individually transmitting the data packets at the transmission times defined by the time intervals.

9. In an access device, a computer-controlled method of constructing and transmitting a password utilized by an authentication device to authenticate the access device, said method comprising:
receiving through an input device from a user, a plurality of predefined characters forming a User ID;
transmitting an access message containing the User ID to the authentication device;
receiving an index value from the authentication device in response to the access message;
identifying a character set associated with the index value in a memory in which a plurality of character sets are stored, each character set including a plurality of predefined characters, wherein each character set is associated with a predefined index value;
generating a password utilizing the identified character set associated with the index value received from the authentication device; and
transmitting the password to the authentication device.

10. The method of claim 9, wherein the step of generating a password includes replacing the User ID with the character set associated with the index value received from the authentication device.

11. The method of claim 9, wherein the step of generating a password includes integrating the User ID and the character set to form the password.

12. The method of claim 11, wherein the step of integrating the User ID and the character set includes adding the character set to the end of the User ID.

13. The method of claim 11, wherein the step of integrating the User ID and the character set includes adding the character set to the beginning of the User ID.

14. The method of claim 11, wherein the step of integrating the User ID and the character set includes interleaving characters from the character set between the characters of the User ID.

15. The method of claim 9, wherein the character sets stored in the memory define time intervals utilized by the transmitting means to separate the transmission times of the characters of the User ID, wherein the transmitting step includes placing the characters of the User ID in different data packets, and individually transmitting the data packets at the transmission times defined by the time intervals.

16. A computer-controlled system for constructing, transmitting, and authenticating a password utilized by an authentication device to authenticate an access device, said system comprising:

an authentication device for authenticating the password, said authentication device including at least one processor for controlling the following components:

communication means for receiving a User ID from the access device;

means for selecting an index value associated with the User ID;

means for including the selected index value in an acknowledgment message returned to the access device;

communication means for subsequently receiving a password from the access device; and means for authenticating the access device if the password matches stored information associated with the access device and the selected index value; and an access device for constructing and transmitting the password, said access device including at least one processor for controlling the following components:

means for receiving the User ID through an input device from a user;

means for transmitting an access message containing the User ID to the authentication device;

communication means for receiving the acknowledgment message from the authentication device, said acknowledgment message including the selected index value;

a memory for storing a plurality of character sets, each character set including a plurality of predefined characters, wherein each character set is associated with a predefined index value;

means for retrieving a stored character set associated with the selected index value received from the authentication device;

means for generating a password utilizing the character set associated with the selected index value; and means for transmitting the password to the authentication device.

17. The system of claim 16, wherein the means for generating a password verifies that the received User ID is a valid User ID, and if valid, replaces the User ID with the character set associated with the index value received from the authentication device.

18. The system of claim 16, wherein the means for generating a password includes means for integrating the User ID and the character set associated with the index value to form the password.

19. The system of claim 18, wherein the means for integrating the User ID and the character set adds the character set associated with the index value to the end of the User ID.

20. The system of claim 18, wherein the means for integrating the User ID and the character set adds the character set associated with the index value to the beginning of the User ID.

21. The system of claim 18, wherein the means for integrating the User ID and the character set interleaves characters from the character set associated with the index value between the characters of the User ID.

22. The system of claim 16, wherein the character sets stored in the memory define time intervals utilized by the transmitting means to separate the transmission times of the characters of the User ID, wherein the transmitting means in the access device includes means for placing the characters of the User ID in different data packets, and individually transmitting the data packets to the authentication device at the transmission times defined by the time intervals.

23. The system of claim 16, wherein the authentication device also includes means for sending replacement character sets to the access device, said access device including means for writing the replacement character sets to the memory.

* * * * *